Patented Sept. 19, 1922.

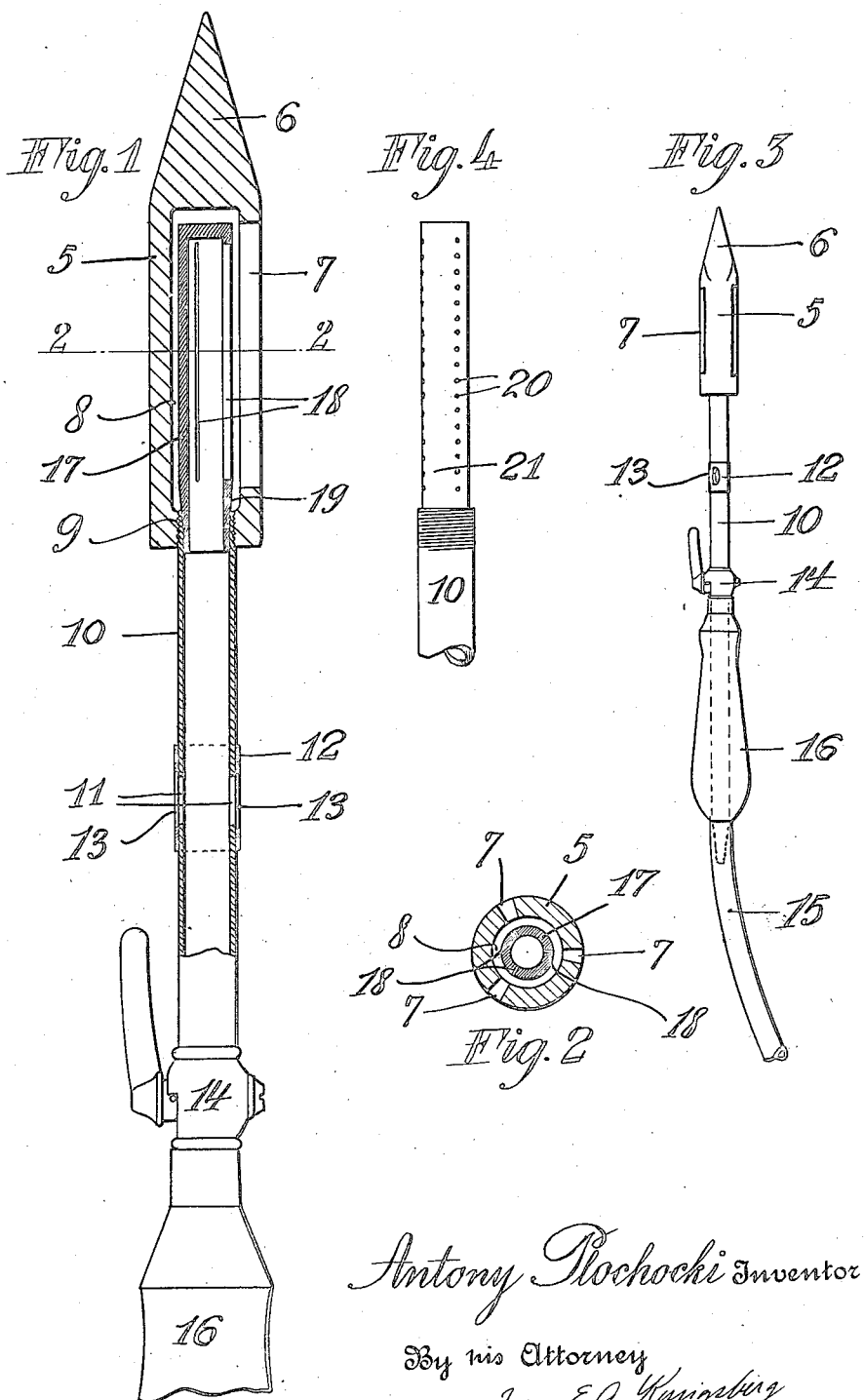

1,429,626

UNITED STATES PATENT OFFICE.

ANTONY PLOCHOCKI, OF BROOKLYN, NEW YORK, ASSIGNOR TO HIMSELF AND ADAM WEISMAN, OF BROOKLYN, NEW YORK.

SOLDERING IRON.

Application filed November 28, 1921. Serial No. 518,158.

*To all whom it may concern:*

Be it known that I, ANTONY PLOCHOCKI, a citizen of the United States, and resident of Brooklyn, in the county of Kings and State of New York, have invented certain new and useful Improvements in Soldering Irons, of which the following is a specification.

This invention relates to soldering irons of the type which is heated by gas mixed with air, the gas being supplied through a flexible hose attached to a gas pipe.

The object of the invention is to provide a novel and generally improved gas soldering iron which shall be simple in its construction, and efficient in operation. Another object is to provide a soldering iron which may be taken apart very easily for shipping or repair purposes.

In the accompanying drawing illustrating my invention—

Fig. 1 is a longitudinal sectional view of a soldering iron embodying my invention, parts being shown in elevation and parts being broken away.

Fig. 2 is a cross sectional view of the soldering head taken on line 2—2 of Fig. 1.

Fig. 3 is a view of the complete soldering iron.

Fig. 4 illustrates a modified burner.

Referring to Fig. 1, the reference numeral 5 denotes a cylindrical soldering head, preferably of copper, provided with the usual operating pointed end 6. The head 5 is hollow and is provided with three equally spaced slots 7, 7 which lead to the interior combustion chamber 8, the rear entrance to which is threaded as at 9.

A gas and air supply pie 10 is screwed into the head 5 at 9 and is provided with air inlets 11. A sleeve 12 is maintained in place on the pipe by friction, yet fits loose enough to permit adjustment of the air inlets 7 by the sleeve openings 13 as will be readily understood. 14 is a valve for regulating the gas supplied through the flexible hose 15. An operating handle 16 is provided on the end of the pipe 10.

Within the soldering head 5 is contained the burner 17 which is in the form of a cylinder which fits within the combustion chamber as shown. The burner may be made of soapstone or other suitable material, and is provided with three equally spaced very thin slots or cuts 18, 18, through which the gas passes from the gas pipe to the combustion chamber.

The rear end 19 of the burner is tapered so that it may be easily removed from and inserted into the gas pipe. This manner of connecting the burner and the pipe 10 also permits of rotary adjustment of the burner so as to position the ignition openings 18 to the one side of the slots 7 as seen in Fig. 2.

I have found that by accurately positioning the burner as shown, the flame burns more evenly around the burner and within the combustion chamber, and the soldering head is heated without wasting gas. The adjustment may be made by means of a knife blade or the like operating through the slots 7.

Instead of slots I may use a series of small holes 20 such as shown in the burner 21 in Fig. 4.

It will be noted that a soldering iron as herein disclosed is very simple in construction and is very efficient in operation. The soldering head is quickly heated and may be kept at the required temperature by regulating the sleeve 12 and the valve 14.

The head and pipe 10 are easily separated at 9 and the burner taken out for cleaning or removal.

I claim:

As a new article of manufacture, a soldering iron comprising in combination a cylindrical soldering pointed head having a cylindrical axially disposed rearwardly open combustion chamber within the same, a gas supply pipe screwed into the said rear opening of the said chamber, a valve in said pipe for controlling the flow of gas therethrough, an operating handle on said pipe, air inlet openings provided in said pipe, an apertured sleeve on said pipe for adjusting the said air inlet openings therein, a burner member having a tapered end adapted to be held frictionally in the said gas supply pipe in centrally disposed operative position within the said combustion chamber, said burner member having three longitudinal circumferentially equally spaced slots leading from the said gas supply pipe to the said combustion chamber, three longitudinally circumferentially equally spaced wider slots leading from the said combustion chamber to the outside of said soldering head, the burner member being adapted to be placed in position within said combustion chamber with the three burner member slots in predetermined operative relationship to the said three slots in the soldering head whereby to regulate the flow of the gas from the said gas pipe to the slots in the soldering head.

ANTONY PLOCHOCKI.